United States Patent
Kumar et al.

(10) Patent No.: US 10,495,769 B2
(45) Date of Patent: Dec. 3, 2019

(54) SYSTEM AND METHOD FOR RESERVOIR SIMULATION USING ON-DEMAND DATA

(75) Inventors: Amit Kumar, Houston, TX (US); Priyesh Ranjan, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 531 days.

(21) Appl. No.: 14/395,426

(22) PCT Filed: Apr. 30, 2012

(86) PCT No.: PCT/US2012/035853
§ 371 (c)(1),
(2), (4) Date: Oct. 17, 2014

(87) PCT Pub. No.: WO2013/165363
PCT Pub. Date: Nov. 7, 2013

(65) Prior Publication Data
US 2015/0081264 A1 Mar. 19, 2015

(51) Int. Cl.
*G01V 1/30* (2006.01)
(52) U.S. Cl.
CPC ........... *G01V 1/30* (2013.01); *G01V 2210/66* (2013.01); *G01V 2210/72* (2013.01)
(58) Field of Classification Search
CPC ... G01V 1/30; G01V 2210/66; G01V 2210/72
USPC ........................................................ 703/10
See application file for complete search history.

(56) References Cited

U.S. PATENT DOCUMENTS

| 7,584,081 B2 | 9/2009 | Wen et al. |
| 8,131,470 B2 | 3/2012 | Yusti et al. |
| 9,249,654 B2* | 2/2016 | Strachan ................. E21B 44/00 |
| 2007/0185696 A1* | 8/2007 | Moran .................... E21B 44/00 703/10 |
| 2008/0071477 A1* | 3/2008 | Li ............................ G01V 1/30 702/14 |
| 2008/0154563 A1 | 6/2008 | Kumar et al. |

(Continued)

FOREIGN PATENT DOCUMENTS

| CA | 2691709 A1 | 12/2008 |
| WO | WO-2009-006526 A2 | 1/2009 |

(Continued)

OTHER PUBLICATIONS

Federal Institute of Industrial Property of the Federal Service on Industrial Property, Patent and Trade Marks, Search Report, Jun. 26, 2015, 2 pages, Russia.

(Continued)

*Primary Examiner* — Rehana Perveen
*Assistant Examiner* — Justin C Mikowski

(57) ABSTRACT

A method of modeling a formation is described. In one aspect of the disclosure, the method includes initiating operation of a reservoir simulator, and, following initiation of operation of the simulator, retrieving formation data from an external data source via a communications network and utilizing the retrieved data as part of the on-going simulation. In certain embodiments, a data deck may be supplied to the simulator before operation of the simulator is initiated. The data deck may include information for establishing a network communications link between the reservoir simulator and an external data server.

26 Claims, 3 Drawing Sheets

(56) References Cited

U.S. PATENT DOCUMENTS

| | | | |
|---|---|---|---|
| 2008/0179094 A1* | 7/2008 | Repin | E21B 44/00 175/50 |
| 2008/0183451 A1 | 7/2008 | Weng et al. | |
| 2009/0006054 A1 | 1/2009 | Song | |
| 2009/0089028 A1* | 4/2009 | Sagert | E21B 47/00 703/6 |
| 2009/0119018 A1* | 5/2009 | Priezzhev | G01V 1/301 702/11 |
| 2009/0182541 A1* | 7/2009 | Crick | E21B 43/00 703/10 |
| 2009/0187391 A1* | 7/2009 | Wendt | G01V 1/28 703/7 |
| 2009/0254325 A1 | 10/2009 | Gokdemir et al. | |
| 2009/0265110 A1* | 10/2009 | Narayanan | E21B 41/00 702/6 |
| 2010/0023269 A1 | 1/2010 | Yusti et al. | |
| 2010/0155142 A1 | 6/2010 | Thambynayagam et al. | |
| 2011/0125476 A1 | 5/2011 | Craig | |
| 2011/0191080 A1 | 8/2011 | Klie | |
| 2011/0257944 A1 | 10/2011 | Du et al. | |
| 2013/0289962 A1* | 10/2013 | Wendt | G01V 1/28 703/10 |

FOREIGN PATENT DOCUMENTS

| | | |
|---|---|---|
| WO | WO-2009-075946 A1 | 6/2009 |
| WO | WO-2010-115211 A1 | 10/2010 |

OTHER PUBLICATIONS

European Patent Office, Supplementary European Search Report, dated Mar. 17, 2016, 7 pages, Europe.

Canadian Intellectual Property Office, Office Action, Application No. 2,871,407, dated Jan. 14, 2016, 4 pages, Canada.

Bieker, H.P., et al., Real-Time Production Optimization of Oil and Gas Production Systems: A Technology Survey, Nov. 2007 Society of Petroleum Engineers Production & Operations (SPE 99446), 10 pages, Richardson, Texas, USA.

Chawathe, A., et al., Interactive Reservoir Simulation With the World Wide Web, SPE-38121-PA, SPE Computer Applications, 3 pages, vol. 9, Society of Petroleum Engineers, 1997., https://www.onepetro.org/journal-paper/SPE-38121-PA.

Meng, H. Z., et al., Web-based Collaborative Technical Workflow Management, Business Briefing: Exploration & Production: The Oil & Gas Review 2003, 3 pages, vol. 2, http://www.ireservoir.com, iReservoir.com, Inc., Littleton, Colorado, USA.

Sarma, P., et al., Efficient Real-Time Reservoir Management Using Adjoint-Based Optimal Control and Model Updating, Computational Geosciences (2006) 10:3-36 DOI: 10.1007/s10596-005-9009-z, 34 pages, onlineservice@springer.com.

Search Report and Written Opinion of the International Searching Authority; dated Aug. 10, 2012; 18 pages; U.S. International Searching Authority.

Wen, X.-H.. et al. Some Practical Issues on Real-Time Reservoir Model Updating Using Ensemble Kalman Filter, IPTC 11024, 14 pages, 2005 International Petroleum Technology Conference, Richardson, TX, USA.

* cited by examiner

SYSTEM AND METHOD FOR RESERVOIR SIMULATION USING ON-DEMAND DATA

BACKGROUND

Reservoir simulation is an area of reservoir engineering that employs computer models to predict the transport of fluids, such as petroleum, water, and gas, within a reservoir. Reservoir simulators are used by petroleum producers in determining how best to develop new fields, as well as generate production forecasts on which investment decisions can be based in connection with developed fields.

Software simulations of oil and gas reservoirs are typically based on data that has been previously collected by an engineer and entered into an "input data deck." This data may include down-hole data collected by well monitoring sensor systems, surface data collected by reservoir monitoring systems, solution/output metrics, and data interpretation. Exclusively using previously-collected data prevents the reservoir simulation from reacting to dynamic reservoir changes that may happen during a simulation run. Thus, although existing approaches to reservoir simulation have been satisfactory for their intended purposes, they have not been entirely satisfactory in all respects.

BRIEF DESCRIPTION OF THE DRAWINGS

A more complete understanding of the present disclosure and advantages thereof may be acquired by referring to the following description taken in conjunction with the accompanying figures, wherein.

DETAILED DESCRIPTION

To overcome the above-noted and other limitations of the current approaches, embodiments described herein comprise methods and systems for reservoir simulation using on-demand data.

Figure 1:
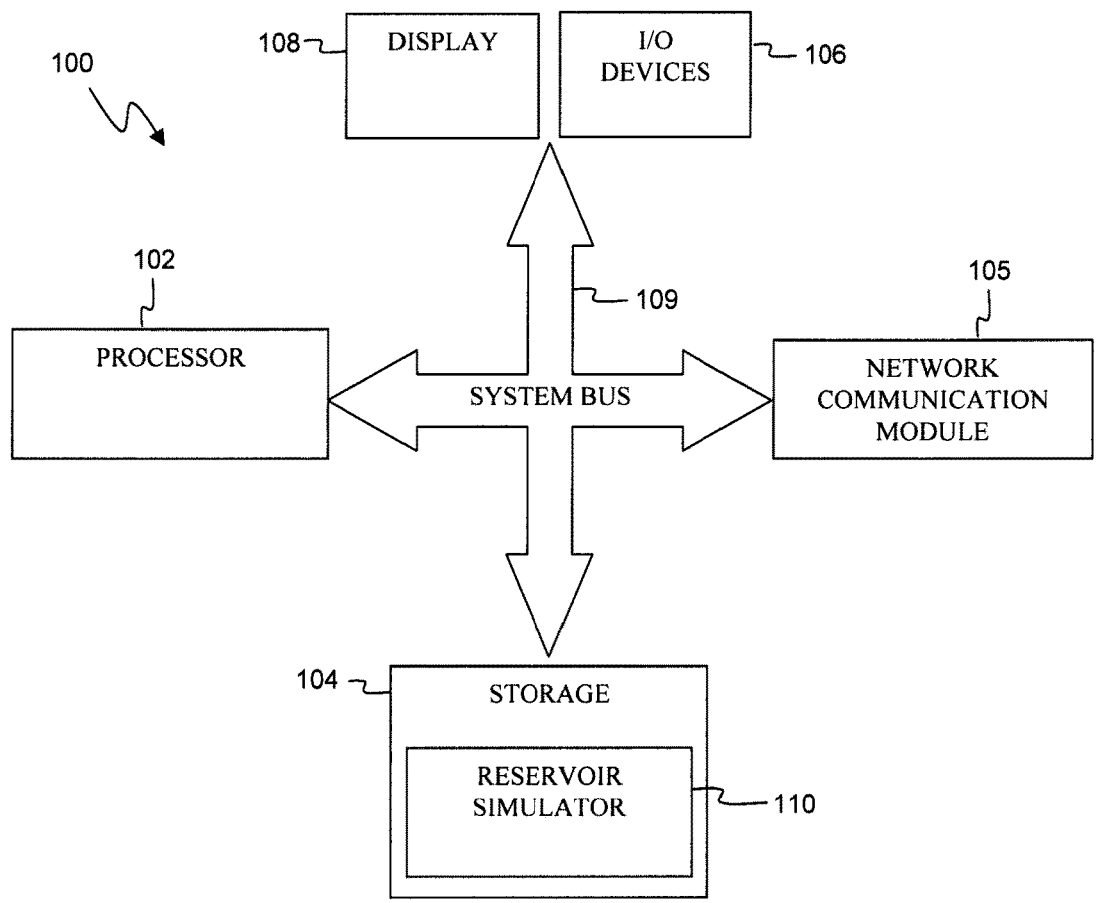
FIG. 1 is a block diagram of a computer system adapted for implementing a reservoir simulation system of exemplary embodiments.

FIG. 1 is a block diagram of an exemplary computer system 100 adapted for implementing the reservoir simulation system as described herein. In one embodiment, the computer system 100 includes at least one processor 102, a non-transitory, computer-readable storage 104, a network communication module 105, optional I/O devices 106, and an optional display 108, and all interconnected via a system bus 109. The network communication module 105 is operable to communicatively couple the computer system 100 to other devices over a network. In one embodiment, the network communication module 105 is a network interface card (NIC) and communicates using the Ethernet protocol. In other embodiment, the network communication module 105 may be another type of communication interface such as a fiber optic interface and may communicate using a number of different communication protocols. It is recognized that the computer system 100 may be connected to one or more public (e.g. the Internet) and/or private networks (not shown) via the network communication module 105. Such networks may include, for example, servers upon which reservoir data is stored. Software instructions executable by the processor 102 for implementing a reservoir simulator 110 in accordance with the embodiments described herein, may be stored in storage 104. It will also be recognized that the software instructions comprising the reservoir simulator 110 may be loaded into storage 104 from a CD-ROM or other appropriate storage media.

In one embodiment of the disclosure, a portion of the reservoir simulator 110 is implemented using reservoir simulation software known in the art. Such reservoir simulation software typically utilizes numerical representations of the reservoir, either as the reservoir currently exists or as it is envisioned to exist at some point in the future, such as before any wells are drilled and prior to any field development. This representation of the reservoir combined with additional data about proposed or existing wells and development strategy allows the software to predict how the reservoir might perform in terms of fluid injection and production.

Software simulations of oil and gas reservoirs are typically based on data that has been previously selected by an engineer and entered into an "input data deck" that is provided to the simulator prior to initiation of a simulation. For purposes of the description of the invention, "pre-collected data" shall mean data that is assembled into a data deck and provided to a simulator prior to initiation of a simulation run. This data may include down-hole data collected by well monitoring sensor systems, surface data collected by reservoir monitoring systems, solution/output metrics, and data interpretation. Exclusively using pre-collected data from a data deck provided to a simulator prior to initiation of a simulation run prevents the reservoir simulator from reacting to dynamic reservoir changes that may happen during a simulation run. Such a scenario also prevents the simulator from making corrections or self adjusting during the simulation using data external to the data deck, and hence, external to the simulator. Certain embodiments of the present invention, as described in more detail below, provide for a method and system for reservoir simulation using on-demand data obtained by the simulator during simulation. For purposes of the description of the invention, "on-demand data" shall mean data external to a simulator and acquired by a simulator after a simulation run has begun. In one embodiment, a reservoir simulator is network-enabled and can connect to various data sources external to the simulator and gather on-demand data for use in an ongoing simulation. Such on-demand data may include data acquired directly from well monitoring equipment deployed at the well site or may be acquired from previously collected reservoir data stored on an external data storage device such as a network server. In some embodiments, the simulator may determine whether to use either pre-collected data included in an input data deck or on-demand data available from the well monitoring tools and/or external data storage. In this manner, a simulation may modify a reservoir model (e.g., a grid block model) in response to changes in a reservoir occurring after the simulation has commenced. The reservoir simulator 110 in the computer system 100 may implement this method and other methods contemplated by the embodiment.

Figure 2:
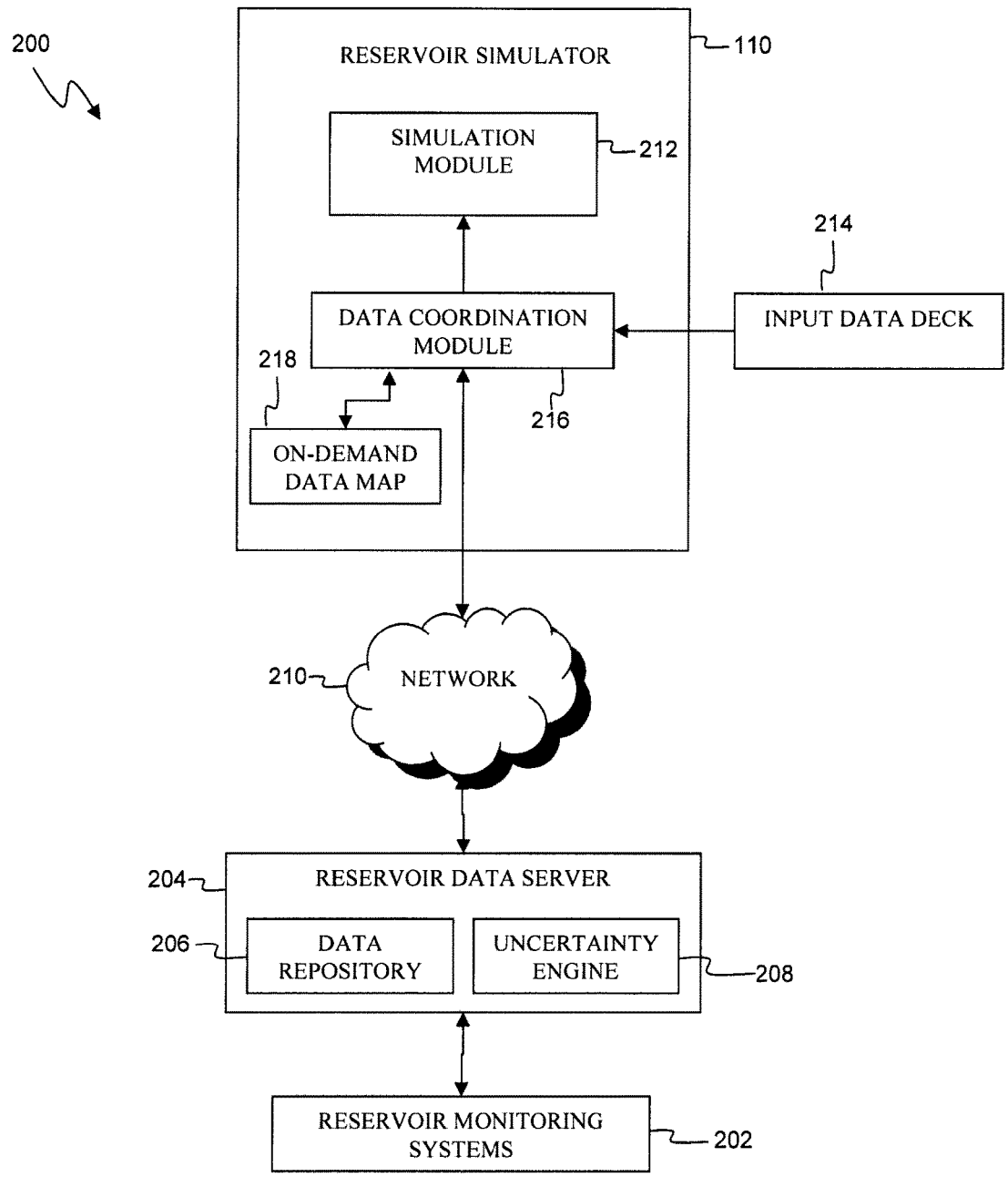
FIG. 2 is a block diagram of a reservoir communication system including the reservoir simulation system of FIG. 1.

Turning to FIG. 2, illustrated is a block diagram of a reservoir simulation system 200 that includes the reservoir simulator 110 of FIG. 1. The reservoir simulation system 200 generally comprises systems and components to monitor and collect data from a reservoir, and make such data available to the reservoir simulator 110 in the form of "on-demand data." As shown in FIG. 2, the reservoir simulation system 200 includes reservoir monitoring systems 202. In the illustrated embodiment, the reservoir monitoring systems 202 may include sensors and other data collection equipment deployed in and around a reservoir and associated wells. The monitoring systems 202 collect data representative of the reservoir, wellbores and changing conditions in and around the wellbores, as well as other portions of a reservoir. For instance, sensors disposed in a wellbore may collect wellbore-centric data such as temperatures, pressures, flows, water cut data, distributed acoustic data, tilt data, and strain data. Likewise, sensors near a wellbore or otherwise disposed adjacent to a formation may collect micro-seismic data. Further, other sensors on a reservoir surface may collect far-field monitoring data such as passive seismic data, erosion data, distributed fluid saturation data, and surface deformation data. One of ordinary skill in the art will recognize that the above types of sensor-based data are just examples and reservoir monitoring systems may collect any number of additional and/or different types of data from both land and sea-based reservoirs or other geologic formations.

As the sensors of the reservoir monitoring systems 202 collect data, they may transmit the data to data repositories for temporary or permanent storage. In that regard, in the illustrated embodiment, the reservoir monitoring systems 202 transmit collected sensor data to a reservoir data server 204. The reservoir data server 204 includes a data repository 206 in which data received from various reservoir sensors is stored. Data stored in the data repository 206 may be formatted in a standard format, such as XML, so that it may be accessed by various data consumers. Further, the repository may associate metadata, such as time stamps or other timing data and/or global positioning data or other location data, with the sensor data stored therein. In certain embodiments, the reservoir data server 204 may further include an uncertainty engine 208 that is operable to validate the incoming data from various monitoring systems. Generally, the uncertainty engine analyzes sensor data and discards or otherwise flags the data if the data is found to be erroneous or suspect. Specifically, in certain embodiments, a received data value may be compared against a probabilistic curve of data values generated by simulating a variety of geologically different reservoir models to measure the likelihood that the received data is correct. In certain embodiments, for a received data value to be considered valid, it must fall between an upper and a lower threshold on the probabilistic curve. In other embodiments, the uncertainty engine may validate incoming sensor data in other various manners known in the art.

As shown in FIG. 2, the reservoir data server 204 is communicatively coupled to a communications network 210. Thus, as reservoir data received from the reservoir monitoring systems 202 is validated and stored in the data repository 206, the reservoir data server 204 may made the data available to requesting systems via the network 210. In one embodiment, the data server 204 is accessible via the Internet (i.e., at a specific URL) and serve data through a web service. In other embodiments, the data server may host data with an FTP server or may be a proprietary data server on a private intranet. Further, in some instances, the reservoir data server 204 may require authentication of incoming connections over the network 210.

As mentioned above, the reservoir simulation system 200 includes the reservoir simulator 110. More specifically, the reservoir simulator 110 functions as a consumer of the data collected and made available by the reservoir data server 204. As shown in FIG. 2, the simulation system 110 is connectively coupled to the network 210—for example, through the network communication module 105 of computer system 100 in FIG. 1. In general, the reservoir simulator 110 is operable to retrieve both pre-collected data as well as on-demand data from the data server 204. Unlike, traditional simulation systems that are limited to pre-collected data supplied in an input data deck, the reservoir simulator 110 is operable to update simulation variables in a reservoir model dynamically by retrieving as on-demand data the most recent reservoir sensor data collected by the data server 204 over the network 210.

In more detail, the reservoir simulator 110 of the illustrated embodiment includes a simulation module 212. The simulation module 212 is operable to create a model of a reservoir and predict the conditions of the reservoir at specific future dates through simulation. For example, the simulation module may be used to predict reservoir production at a point in the future, such as for example, after one year or 15 years. In some instances, a reservoir is modeled using a number of discretized blocks, referred to interchangeably as "blocks," "grid blocks," or "cells." Models can vary in size from a few blocks to hundreds of millions of blocks. In software simulations, it is common to model a reservoir using a grid formed of grid blocks and then simulate reservoir properties (e.g., pressure, temperature) within and between each grid block to predict flow, well production, depletion, and various other factors associated with the extraction of hydrocarbons from a reservoir. As an aspect of this, simulation variables representing characteristics of the reservoir may be associated with each grid block in a grid to create the reservoir model. For example, each grid block in a grid may be associated with a porosity value and a permeability value. To simulate conditions in the reservoir at a specific future time ($T_F$), the simulation module 212 is operable beginning at time zero ($T_N$) to solve sets or systems of equations using the simulation variables associated with the grid blocks of the reservoir model. The invention is not limited to any particular reservoir simulator or systems of equations. Such systems of equations are well known in reservoir simulation and may include, for example, mass/volume balance equations with transport equations such the Darcy law equations. In any event, in certain embodiments, if a time step between $T_N$ and $T_F$ (e.g., two years) is too long for the simulation system to accurately predict reservoir characteristics at $T_F$, the simulation module may divide the time period between $T_N$ and $T_F$ into smaller time steps or time segments and iteratively solve the system of equations for each time step. The simulation module divides the time period into increasingly smaller time segments until the iterations within the time segments converge on sufficiently precise solutions to the system of equations. Of course, one of ordinary skill in the art of reservoir simulation understands that the above is simply one manner in which to simulate reservoir properties, and that various other solutions may exist.

As mentioned above, the simulation model relies upon data representing characteristics of the reservoir as it currently exists to simulate future reservoir conditions. For example, the system of equations solved for each grid block in a model may include one or more simulation variables representative of reservoir characteristics. In the illustrated embodiment, data values associated with the simulation variables may be provided in a number of ways. First, a collection of data values and other simulation parameters may be provided in the form of "pre-collected data" to the simulation module 212 through an input data deck 214, as is typical in most reservoir simulation systems. In one embodiment, an engineer may build the input data deck 214 with pre-collected data values from various sources including reservoir sensor systems. Typically, building a data deck is very time intensive as desired values for a particular simulation are identified, the data representing the desired values is located on a server or is otherwise acquired and the data is formatted for the simulation. The input data deck is then fed into the simulation reservoir system 110 prior to a simulation run, i.e., at a time preceding $T_N$ such as $T_{N-1}$. In typical simulation systems, the only source of data values for simulation variables once a simulation has begun is a pre-built input data deck, such as input data deck 214. However, simulation system 110 of the invention is operable to utilize on-demand data values retrieved from the reservoir data server 204 after time $T_N$ and during a simulation run, as well as pre-collected data values from the input data deck 214.

In more detail, the reservoir simulator 110 includes a data coordination module 216 that is operable to generally coordinate the utilization of on-demand data values and pre-collected data values by the simulation module 212. In certain embodiments, before a simulation run is initiated, the data coordination module processes the input data deck 214. Processing of the pre-collected data may be utilized to i) determine if all of the data values needed for the simulation equations have been provided in the input data deck and/or ii) verify the integrity of the if the values in the data deck are accurate and/or iii) identify those values in the data deck that need to be updated or replaced with on-demand data. In one embodiment, none or only some of the needed data values may be provided in the data deck before a simulation run. Any missing data values may be retrieved as on-demand data from the reservoir data server 204 over the network 210. In that regard, the data coordination module 216 is operable to establish a connection to the reservoir data server 204 over the network 210 so data values may be retrieved on-demand during a simulation run.

In certain embodiments of the invention, the input data deck 214 may include information such as authentication and security credentials (i.e., username, password, etc) needed to establish a connection to the data server 204. Similarly, the input data deck may include the network address of the data server from which to retrieve on-demand data. In some embodiments, although the data coordination module 216 is shown as establishing a connection to a single data server, the reservoir simulator 110 may establish connections to and draw on-demand data values from multiple network-based data servers during a simulation run.

In certain embodiments of the invention, the input data deck 214 may include scripts or other programs that alter or otherwise enhance the reservoir simulator 110. In certain embodiments, the scripts change the way the reservoir simulator 110 handles certain simulation events while the simulation calculations are occurring. For example, a script may be used to look at the calculated values of gas-oil ratio ("GOR") of a simulated well and shut down the well in the simulation model if the calculated value reaches a preset threshold. In another example, a script may be used to modify the way the simulator calculates GOR. In certain embodiments of the invention, the foregoing scripts may utilize pre-collected data, on-demand data, intermediate values calculated by the simulator or a combination of any of the foregoing. In certain embodiments, the scripts may be used to modify the behavior of the simulator itself depending on on-demand data accessed by the reservoir simulator 110.

In the illustrated embodiment, the data coordination module 216 is operable to query the reservoir data server for data values corresponding to simulation variables utilized in simulation equations during a simulation run. In certain embodiments of the invention, the data coordination module 216 may include an on-demand data map 210 and utilize the on-demand data map 218 to determine which data values to retrieve from the data server 204. Specifically, in certain embodiments, the on-demand data map 218 is a data structure—such as a hash map—that associates simulation variables in the reservoir model with sensor data available in the data server 204. For example, the data map 218 may map a simulation variable representing a temperature within a specific grid block to data from a specific temperature sensor in the reservoir that is available at data server 204. In one embodiment, the on-demand data map is provided to the simulation system 110 by the input data deck 214.

After a simulation run has been initiated at $T_N$, the data coordination module 216 is operable to retrieve on-demand data values from network sources one or more times during the course of the simulation run in order to maintain an accurate reservoir model that reflects dynamic changes in reservoir characteristics. For instance, in an embodiment in which a simulation time period $T_F$-$T_N$ has been divided into a plurality of smaller time segments, data coordination module 216 may retrieve updated sensor data values from network sources at simulation initiation and then again before solving the system of equations at each time step $T_{N+1}$. In other embodiments, the on-demand data values may be retrieved before each iteration within a time step. In further embodiments, on-demand data values may be retrieved at other intervals as defined by a user or defined by information in the input data deck.

As mentioned above, the data coordination module 216 is operable in certain embodiments to identify needed data that is missing from the input data deck 214 and retrieve the missing data as on-demand data from the reservoir data server 204 during a simulation run. In other instances, even if a pre-collected data value associated with a simulation variable is already provided by the input data deck 214, the data coordination module 216 may still retrieve an on-demand data value for that simulation variable from the data server before the simulation module solves for an equation containing the variable. In such an instance, after retrieving the on-demand data value, the data coordination module may determine whether to set the simulation variable equal to the pre-collected data value or the on-demand data value. In certain embodiments, the two values may be utilized to check the integrity of the pre-collected data of the data deck. For example, in certain embodiments, the on-demand data value will be used if it reflects any amount of change in a specific reservoir characteristic over the pre-collected data value. In other embodiments, the on-demand data value may only be utilized if it differs from the pre-collected data value in a certain manner. Further, in other embodiments, the data coordination module 214 may perform some additional validation checks on incoming on-demand data values and only utilize such data if the data meets certain criteria. Such criteria may be defined in the input data deck 214 in some embodiments. For instance, the data coordination module 216 may scrutinize any metadata associated with retrieved on-demand data values. For example, in one embodiment, the data coordination module 216 may utilize a pre-collected data value from the input data deck over a corresponding on-demand data value if the on-demand data value has an earlier timestamp than the pre-collected data value. It is understood that the above description of the manner in which the data coordination module 216 determines which data values to utilize in a simulation is just an example and the data coordination module may make such a determination in a number of additional and/or different manners.

Further, the data coordination module 216 is defined as an integrated module for explanation purposes only, and the functions described above as being carried out by the data coordination module may be performed by a number of different components within the reservoir simulation system, including ones not illustrated in FIG. 2. Additionally, the reservoir simulator 110 and the reservoir simulation system 200 as shown in FIG. 2 have each been simplified for the sake of clarity and may include additional components, modules, and functionality not shown in FIG. 2.

Figure 3:
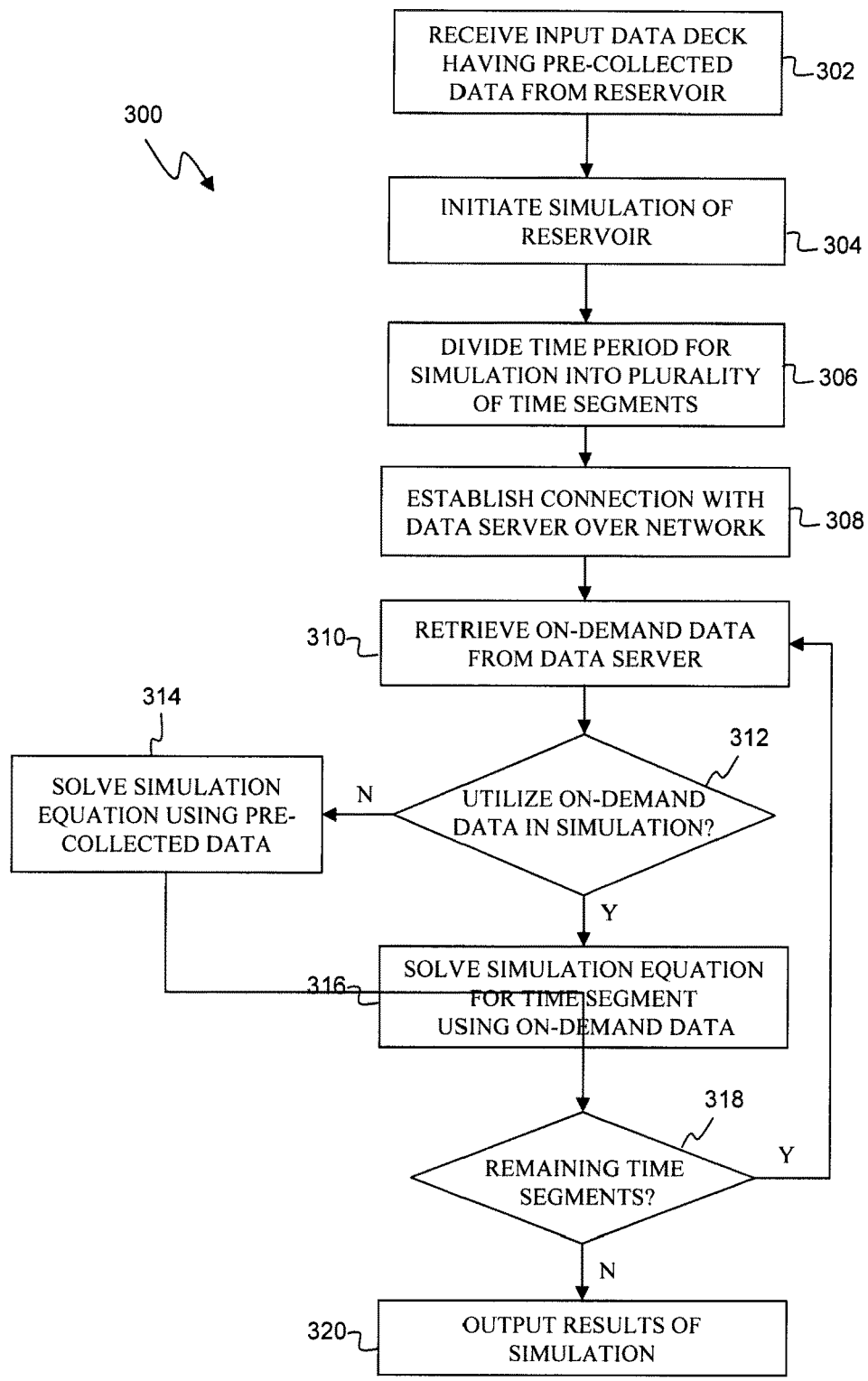
FIG. 3 is a flowchart illustrating a method implemented by the reservoir communication system of FIG. 2 for performing embodiments described herein.

Referring now to FIG. 3, illustrated is a flowchart of a method 300 implemented by the reservoir communication system of FIG. 2 for performing embodiments described herein. In general, the method 300 describes a manner of utilizing on-demand data in a reservoir simulation system according to one embodiment of the current disclosure. In more detail, the method 300 begins at block 302 where the input data deck 214 is input into the reservoir simulator 110. As described above, the input data deck 214 may include, among other things, pre-collected data values associated with the simulation variables of the simulation system. With respect to the timing of the method 300, receiving the input data deck 214 at block 302 may occur at a time prior to $T_N$, such as $T_{N-1}$.

After the input data deck 214 has been fed into the reservoir simulator 110, the method 300 proceeds to block 304 where a simulation of a reservoir is initiated by the simulation system 110. With respect to the timing of the method 300, initiating the simulation at block 304 may occur at a time $T_N$. As an aspect of this, a simulation run is typically performed to determine the characteristics of the reservoir over a simulation time period. For example, it may be desirable to predict flow of a formation over a one year period, or perhaps over an extended period, such as 20 years. In some instances, the time period selected depends on the predicted number of years a reservoir will be producing oil and/or gas. The method 300 next proceeds to block 306 where the simulation time period is divided into a plurality of time steps or segments to increase the efficiency and accuracy of the simulation. As described above, systems of equations representing reservoir dynamics may be iteratively solved in each time step. In some embodiments, if the simulation time period is sufficiently short, the method 300 may skip this block.

Next, in block 308, the data coordination module 216 establishes a connection to the reservoir data server 204 over the communication network 210. Connection parameters may be provided in the input data deck 214 received in block 302. For example, the input data deck may include a username and password, as well as a URL identifying the location of the on-demand data. As mentioned above, the data server 204 includes the data repository 206 that stores sensor data collected from a reservoir. In various embodiments, such a data connection may be established before or after the simulation time period is divided into smaller time segments in block 306. After a connection to the data server 204 is established, the method proceeds to block 310, where the data coordination module 216 retrieves on-demand data values from the data server. That is, as the simulation prepares to solve a system of equations that includes a specific set of simulation variables, the data coordination module 216 retrieves data values associated with the simulation variables from the data server 204. In some embodiments, prior to the retrieving, the data coordination module 216 determines which data values need to be retrieved using the on-demand data map 218, which lists data values available at the data server. With respect to the timing of the method 300, retrieving the on-demand data values at block 310 may occur at a time $T_{N+1}$, i.e., any time after simulation has begun. For purposes of the description, simulation is considered to have initiated when the reservoir simulation application or module 212, whether alone or as part of a larger computer application, is launched through a script, command line, computer code, graphical interface, or any other means, after the reservoir simulation system has been supplied with pre-collected data as described herein. In the illustrated embodiment of method 300, the data coordination module 216 retrieves data values before solving equations in each time segment, while, in alternative embodiments, on-demand data may be retrieved at different instances during a simulation run.

The method 300 next moves to decision block 312 where the data coordination module 216 determines whether to utilize the on-demand data values retrieved in block 310 to simulate reservoir properties in a particular time segment. If the input data deck does not include a pre-collected data value for a simulation variable, then the simulation variable may automatically be set equal to the on-demand value. Or, in some embodiments, an internally-calculated data value may be utilized for the simulation variable instead of the on-demand data value. Of course, the simulator may utilize a combination of pre-collected data supplied with the data deck and on-demand data acquired after initiation of the reservoir simulator. In any event, if the input data deck does include a pre-collected data value for the simulation variable, then the data coordination module 216 determines whether to set the simulation variable equal to the on-demand data value or the pre-collected data value. This determination may be made in any number of manners, including those illustrated in previous sections. Further, the on-demand simulation variable may be utilized in any number of different and/or additional ways to assist in the simulation of the reservoir of interest, and may not be directly applied to the simulation variables as described above. If the data coordination module 216 determines not to utilize the on-demand data, the method proceeds to block 314, where the pre-collected data from the input data deck 214 is utilized to solve simulation equations. If, instead, the data coordination module 216 determines the on-demand data should be utilized, either alone or in combination with pre-collected data, the method 300 moves to block 316 where the retrieved data values are utilized to solve the simulation equations in a particular time segment. In one embodiment, the simulation variables in the equations may be set equal to the on-demand data values, but in other embodiments, the on-demand data values may be utilized in some other manner. It should also be understood that while the invention is being described in terms of either on-demand data or pre-collected data, the reservoir simulator may also utilize intermediate data generated by the simulator from use of the foregoing on-demand or pre-collected data.

After the system of equations in a particular time segment have been solved utilizing either the pre-collected data in block 314 or the on-demand data values in block 316, the method 300 proceeds to decision block 318 where it is determined whether any additional time steps remain to complete the simulation time period. If yes, the method 300 returns to block 310 where the data coordination module 216 retrieves additional on-demand data values from the data server 204 for the simulation variables associated with the equations in the next time segment. In some embodiments, an up-to-date data value for a particular simulation variable is retrieved even if a data value for the same simulation variable was retrieved in association with a previous time step. In this manner, the reservoir model upon which the simulation is based is constantly updated using the most recent sensor data collected at the reservoir. If the simulation module 212 has simulated the entire requested time period upon reaching decision block 318, then the method 300 proceeds to block 320 where the results of the simulation run are output.

It is understood that method 300 of utilizing on-demand data values during a reservoir simulation of the illustrated embodiment is simply an example and in alternative embodiments, additional and/or different steps may be included in the method. For example, although the data coordination module 216 is described in method 300 as retrieving on-demand data before each time step in a simulation time period, in other embodiments, the data coordination module may retrieve on-demand data at the beginning of each iteration within one or more time step calculations.

In one exemplary aspect, the present disclosure is directed to a method of modeling a formation. The method includes initiating operation of a reservoir simulator, and, following initiating operation, retrieving formation data from an external data source via a communications network. The method also includes utilizing the retrieved formation data to perform a reservoir simulation.

In another exemplary aspect, the present disclosure is directed to a method of modeling a formation. The method includes initiating a simulation of the formation, the simulation being based at least in part on an equation that includes a simulation variable representative of a characteristic of the formation and establishing a connection with a data repository over a communications network, the data repository holding data collected by sensors disposed at the formation. The method also includes, subsequent to the step of initiating, retrieving an on-demand data value associated with the simulation variable from the data repository and utilizing the on-demand data value in conjunction with the simulation variable to solve the equation.

In yet another exemplary aspect, the present disclosure is directed to a method of modeling a formation over a time period. The method includes initiating a simulation of the formation, the simulation being based at least in part on an equation that includes a simulation variable representative of a characteristic of the formation and dividing the time period into a plurality of time segments. The method also includes establishing a connection with a data repository over a communications network, the data repository holding data collected by sensors disposed at the formation and retrieving an on-demand data value associated with the simulation variable from the data repository. Further, the method includes utilizing the on-demand data value in conjunction with the simulation variable to solve the equation for a first time segment in the plurality of time segments and repeating the retrieving and utilizing for each time segment in the plurality of time segments.

In a further exemplary aspect, the present disclosure is directed to a computer-implemented reservoir simulation system. The system includes a processor, a network communication module communicatively coupled to the processor, a non-transitory storage medium accessible by the processor, and software instructions stored on the storage medium and executable by the processor. The software instructions are executable by the processor for: initiating operation of the reservoir simulation system, following initiating operation, retrieving formation data from an external data source via a communications network using the network communication module and utilizing the retrieved formation data to perform a reservoir simulation.

The foregoing methods and systems described herein are particularly useful in creating and executing a plan to develop a reservoir. First a reservoir is modeled as described herein to design a well completion plan for a well. In an embodiment, the drilling well completion plan includes the selection of proposed wellbores in a formation. The well completion plan may further include a fracturing plan, which may include the selection of fracture zones and their positioning, fracturing fluids, proppants and fracturing pressures. In other embodiments, the drilling well completion plan may include selecting a particular trajectory of the wellbore or selecting a desired wellbore pressure to facilitate mass transfer and fluid flow to the wellbore. The reservoir simulator may then be run to model reservoir production over a period of time utilizing proposed wells, along with on-demand and pre-collected data from the existing reservoir. Based on the model, a drilling plan may be implemented and a wellbore drilled in accordance with the plan. Those of ordinary skilled in the art will appreciate that while the method of the invention has been described statically as part of implementation of a drilling plan, the method can also be implemented dynamically. Thus, a drilling plan may be implemented and data from the drilling process, and in particular, the actual flow characteristics of the reservoir, may be used to update the model for the drilling of additional wellbores within the reservoir. After implementing the drilling plan, the reservoir simulation system of the invention may be utilized during the drilling process on the fly or iteratively to calculate and re-calculate future flow estimates for the reservoir as parameters change or are clarified or adjusted during drilling or production. In either case, the results of the dynamic calculations may be utilized to alter a previously implemented drilling plan.

In a further exemplary aspect, the present disclosure is directed to a method for drilling a wellbore in reservoir. The method includes utilizing the reservoir simulation system of the invention and as described herein to model reservoir flow and develop a drilling plan. Once reservoir flow has been modeled, the method includes preparing equipment to construct a portion of a wellbore in accordance with the drilling plan, initiating drilling of the wellbore and thereafter, drilling a wellbore in accordance with the drilling plan.

While the reservoir simulation system has been described in the context of subsurface modeling, it is intended that the simulator and system described herein can also model surface and subsurface coupled together. A non-liming example of such a simulator is the modeling of fluid flow in a surface network consisting of flowlines, pipelines, pumps, and equipment such as pumps, compressors, valves, etc coupled with the well and the reservoir together as an integrated flow network or system. In such case, the "web-enabled" simulator can retrieve and utilize during simulation on-demand data arising from the well, the reservoir, and/or the surface network.

While the reservoir simulation system has been described primarily in terms of flow through a network that may consist of a field, a partial field, a well, multiple wells, and pipeline, or any portion thereof, it will be appreciated that the reservoir simulation system described herein may be implemented for mapping reservoirs to a grid and analysis of grid properties, such as pressures, saturations, relative permeability, etc. at a plurality of grid cell at a plurality of time steps. In any event, the output from such reservoir simulation systems may be two dimensional or three dimensional grids, tables or two dimensional plots of data. For example, a two dimensional plot may illustrate production rate of oil (STB/D) over a period of time. Likewise, a three dimensional plot may illustrate water saturation of a field over a period of time.

While certain features and embodiments of the disclosure have been described in detail herein, it will be readily understood that the disclosure encompasses all modifications and enhancements within the scope and spirit of the following claims. Furthermore, no limitations are intended in the details of construction or design herein shown, other than as described in the claims below. Moreover, those skilled in the art will appreciate that description of various components as being oriented vertically or horizontally are not intended as limitations, but are provided for the convenience of describing the disclosure.

It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee.

What is claimed is:

1. A method comprising:
   retrieving, by a reservoir simulator, an input data deck, wherein the input data deck includes pre-collected formation data associated with a plurality of simulation variables for a reservoir simulation;
   initiating a simulation run of the reservoir simulation for the reservoir simulation, based on the pre-collected formation data;
   following the initiation of the simulation run, identifying, by the reservoir simulator, at least one of the plurality of simulation variables in the pre-collected formation data that as missing data;
   retrieving, by the reservoir simulator from an external data source via a communications network, on-demand formation data associated with the at least one identified simulation variable during a first time segment of the simulation run;
   updating the pre-collected formation data using the on-demand formation data retrieved during the first time segment;
   retrieving, by the reservoir simulator from the external data source via the communications network, additional on-demand formation data associated with the plurality of simulation variables during a second time segment of the simulation run;
   comparing the additional on-demand formation data for the at least one identified simulation variable and the updated pre-collected formation data associated with the at least one identified simulation variable to determine whether the additional on-demand formation data differs from the updated pre-collected formation data;
   when it is determined that the additional on-demand formation data differs from the updated pre-collected formation data for the at least one identified simulation variable, utilizing the retrieved additional on-demand formation data to perform the reservoir simulation during the simulation run of the reservoir simulator;
   when it is determined that the additional on-demand formation data does not differ from the updated pre-collected formation data for the at least one identified simulation variable, utilizing the updated pre-collected formation data to perform the reservoir simulation during the simulation run of the reservoir simulator; and
   outputting the results of the simulation run of the reservoir simulator;
   drilling a wellbore in a formation based on the outputted results from the reservoir simulation simulator.

2. The method of claim 1, wherein the input data deck further includes data to permit access to the external data source.

3. The method of claim 1, wherein performing the reservoir simulation comprises solving an equation for a plurality of time steps; and wherein the on-demand formation data is retrieved from the external data source at the beginning of at least one time step of the plurality of time steps.

4. The method of claim 3, wherein solving the equation comprises performing a plurality of iterations associated with the equation at each time step; and wherein the on-demand formation data is retrieved from the external data source at the beginning of at least one iteration of the plurality of iterations.

5. The method of claim 1, wherein the simulation run of the reservoir simulator is initiated at Tn; and wherein retrieving the on-demand formation data from the external data source begins at Tn+1.

6. The method of claim 1, further comprising retrieving an input data deck for the reservoir simulator at Tn−1, wherein the input data deck includes the pre-collected formation data and data to permit access to the external data source, the simulation run of the reservoir simulator is initiated at Tn, and the on-demand formation data is retrieved from the external data source at Tn+1.

7. A method comprising:
   retrieving, prior to the initiating, an input data deck having a pre-collected data value associated with a simulation variable;
   receiving the pre-collected data value associated with the simulation variable for a simulation of a reservoir within a formation;
   initiating the simulation of a reservoir within a formation, based on an equation that includes the simulation variable representative of a characteristic of the formation and the pre-collected data value associated with the simulation variable;
   establishing a connection with a data repository over a communications network, the data repository holding data collected by sensors disposed at the formation;
   subsequent to the initiating, identifying data associated with the simulation variable in the pre-collected data value as missing data;
   retrieving an on-demand data value associated with the identified simulation variable from the data repository during a first time segment;
   updating the pre-collected data value using the on-demand data value retrieved during the first time segment of the simulation run;
   retrieving an additional on-demand data value associated with the simulation variable from the data repository during a second time segment of the simulation run;
   comparing the additional on-demand data value for the at least one identified simulation variable and the updated pre-collected data value associated with the at least one identified simulation variable to determine whether the additional on-demand data value differs from the updated pre-collected data value;
   when it is determined that the additional on-demand data value differs from the updated precollected data value for the at least one identified simulation variable, utilizing the additional on-demand data value in conjunction with the simulation variable to solve the equation during the simulation;

when it is determined that the additional on-demand data value does not differ from the updated pre-collected data value for the at least one identified simulation variable, utilizing the updated pre-collected data value in conjunction with the simulation variable to solve the equation during the simulation;

outputting the results of the simulation run of the simulation; and drilling a wellbore in the formation based on the outputted results from the simulation.

8. The method of claim 7, wherein utilizing the additional on-demand data value in conjunction with the simulation variable includes setting the simulation variable to the additional on-demand data value, and comparing further includes determining whether to set the simulation variable equal to the additional on-demand data value, based on the comparison between the additional on-demand data value and the updated pre-collected data value.

9. The method of claim 7, wherein utilizing the additional on-demand data value in conjunction with the simulation variable includes setting the simulation variable to the additional on-demand data value, utilizing the updated pre-collected data value in conjunction with the simulation variable includes setting the simulation variable to the updated precollected data value, and comparing further includes determining whether to set the simulation variable equal to at least one of the additional on-demand data value or the updated pre-collected data value, based on the comparison between the additional on-demand data value and the updated pre-collected data value.

10. The method of claim 9, wherein the comparing includes determining an amount of change in the characteristic of the formation, based on a difference between the additional on-demand data value and the updated pre-collected data value.

11. The method of claim 7, wherein the input data deck includes connection parameters used to establish the connection with the data repository.

12. The method of claim 11, wherein establishing the connection includes authenticating with the data repository using the connection parameters.

13. The method of claim 7, further including solving the equation a plurality of times during the simulation of the formation; wherein retrieving the on-demand data value is performed prior to solving the equation each of the plurality of times.

14. The method of claim 7, wherein retrieving includes mapping the simulation variable with the on-demand data value stored in the data repository with a data map.

15. The method of claim 7, further comprising the steps of modeling the formation for a select time period; dividing the time period into a plurality of time segments for performing the simulation based on the modeled formation; and repeating the retrieving and the comparing for each time segment in the plurality of time segments, wherein at least one of the additional on-demand data value or the updated pre-collected data value is utilized in conjunction with the simulation variable to solve the equation during the simulation at each time segment.

16. The method of claim 15, further including solving the equation using a plurality of iterations within each time segment, wherein the retrieving is performed prior to each iteration in the plurality of iterations.

17. The method of claim 15, further including receiving, prior to the initiating, an input data deck having the pre-collected data value associated with the simulation variable therein, wherein the comparing further includes determining whether to set the simulation variable equal to at least one of the additional on-demand data value or the updated pre-collected data value, based on the comparison between the additional on-demand data value and the updated pre-collected data value.

18. The method of claim 17, wherein the comparing includes determining an amount of change in the characteristic of the formation, based on a difference between the additional on-demand data value and the updated pre-collected data value.

19. The method of claim 17, wherein the input data deck includes connection parameters used to establish the connection with the data repository and wherein establishing the connection includes authenticating with the data repository using the connection parameters.

20. The method of claim 15, wherein retrieving includes mapping the simulation variable with the on-demand data value stored in the data repository with a data map.

21. A system comprising:
a processor;
a network communication interface communicatively coupled to the processor;
a non-transitory storage medium accessible by the processor; and
processor-readable instructions stored on the storage medium, which, when executed by the processor, cause the processor to perform operations for:
retrieving a data set to a reservoir simulator prior to initiating a simulation run, wherein the data set includes a pre-collected formation data;
receiving the pre-collected formation data associated with a plurality of simulation variables for the reservoir simulation;
initiating a simulation run of the reservoir simulator for the reservoir simulation, based on the pre-collected formation data associated with a simulation variable;
following the initiation of the simulation run, identifying at least one of the plurality of simulation variables in the pre-collected formation data as missing data;
retrieving on-demand formation data associated with the at least one identified simulation variable during a first time segment of the simulation run from an external data source via a communications network using the network communication interface;
updating the pre-collected formation data using the on-demand formation data retrieved during the first time segment;
retrieving additional on-demand formation data associated with the plurality of simulation variables during a second time segment of the simulation run from the external data source via the communications network using the network communication interface;
comparing the additional on-demand formation data for the at least one identified simulation variable and the updated precollected formation data associated with the at least one identified simulation variable to determine whether the additional on-demand formation data differs from the updated pre-collected formation data;
when it is determined that the additional on-demand formation data differs from the updated pre-collected formation data for the at least one identified simulation variable, utilizing the additional formation data to perform the reservoir simulation using the reservoir simulator during the simulation run;

when it is determined that the additional on-demand formation data does not differ from the updated pre-collected formation data for the at least one identified simulation variable, utilizing the updated pre-collected formation data to perform the reservoir simulation using the reservoir simulator during the simulation run;

outputting the results of the simulation run of the reservoir simulator; and drilling a wellbore in a formation based on the outputted results from the reservoir simulator.

22. The system of claim 21, wherein the data set includes data to permit access to the external data source.

23. The system of claim 21, wherein performing the reservoir simulation comprises solving an equation for a plurality of time steps; and wherein the on-demand formation data is retrieved from the external data source at the beginning of at least one time step of the plurality of time steps.

24. The system of claim 23, wherein solving the equation comprises performing a plurality of iterations associated with the equation; and wherein the on-demand formation data is retrieved from the external data source at the beginning of at least one iteration of the plurality of iterations.

25. The system of claim 21, wherein the simulation run of the reservoir simulator is initiated at Tn; and wherein retrieving the on-demand formation data from the external data source begins at Tn+1.

26. The system of claim 21, wherein the operations performed by the processor further include operations for supplying a data set to the reservoir simulator at Tn−1, wherein the data set includes the pre-collected formation data and data to permit access to the external data source, the simulation run of the reservoir simulator is initiated at Tn, and the on-demand formation data is retrieved from the external data source at Tn+1.

* * * * *